United States Patent

[11] 3,610,304

| [72] | Inventors | Samuel J. Popeil<br>179 E. Lake Shore Drive, Chicago, Ill. 60611;<br>Raymond Popeil, 2970 N. Lake Shore Drive, Chicago, Ill. 60657 |
|---|---|---|
| [21] | Appl. No. | 879,098 |
| [22] | Filed | Nov. 24, 1969 |
| [45] | Patented | Oct. 5, 1971 |

[54] FOOD-CUTTING MACHINE
46 Claims, 32 Drawing Figs.

[52] U.S. Cl. ............................................. 146/113 B, 146/115, 146/177
[51] Int. Cl. ....................................... A23n15/00, B26d 4/24
[50] Field of Search ........................................ 146/115, 112, 113, 114, 107, 177, 113 B; 248/362, 363, 206 R

[56] References Cited
UNITED STATES PATENTS

| 2,695,643 | 11/1954 | Aberer | 146/177 |
| 2,749,909 | 6/1956 | Ullery | 30/278 X |
| 3,209,456 | 10/1965 | Lozach | 146/124 X |
| 498,262 | 5/1893 | Hemesath | 146/113 B |
| 2,228,175 | 1/1941 | Miller | 146/115 |
| 365,467 | 6/1887 | Freese | 146/114 |
| 1,840,400 | 1/1932 | Lebherz | 248/362 |
| 2,103,567 | 12/1937 | Van Berkel | 146/113 R X |
| 2,713,367 | 7/1955 | Aberer | 146/177 X |

FOREIGN PATENTS

| 604,319 | 3/1960 | Italy | 146/115 |

Primary Examiner—Wllie G. Abercrombie
Attorney—Dominik, Knechtel & Godula

ABSTRACT: A food-cutting machine for slicing and shredding foodstuffs with semiautomatic feed is disclosed in which a spring-loaded mechanism coacts with a pusher in a chute or hopper having a plurality of rollers on the bottom to feed foodstuffs into a manually rotated reversible cutting disc for slicing, shredding and comminuting foodstuffs. A bayonet fastener for the reversible cutting disc firmly supports the disc against the pressure of the spring-loaded pusher and hopper. The principal parts including the hopper and rollers, deflector, and discs are all removable without the use of independent fasteners, for quick assembly and disassembly as well as cleaning. Two reversible discs are provided which will perform different cuts on each side, thus providing four types of cuts; namely: slicing, grating, julienne and ripple cuts. A suction base with a stop limited knob is shown which limits actuating travel to 180°.

INVENTORS
SAMUEL J. POPEIL
BY  RAYMOND POPEIL
Dominik, Knechtel & Godula
ATTYS.

INVENTORS
SAMUEL J. POPEIL
RAYMOND POPEIL
BY Dominik, Knechtel & Godula
ATTYS.

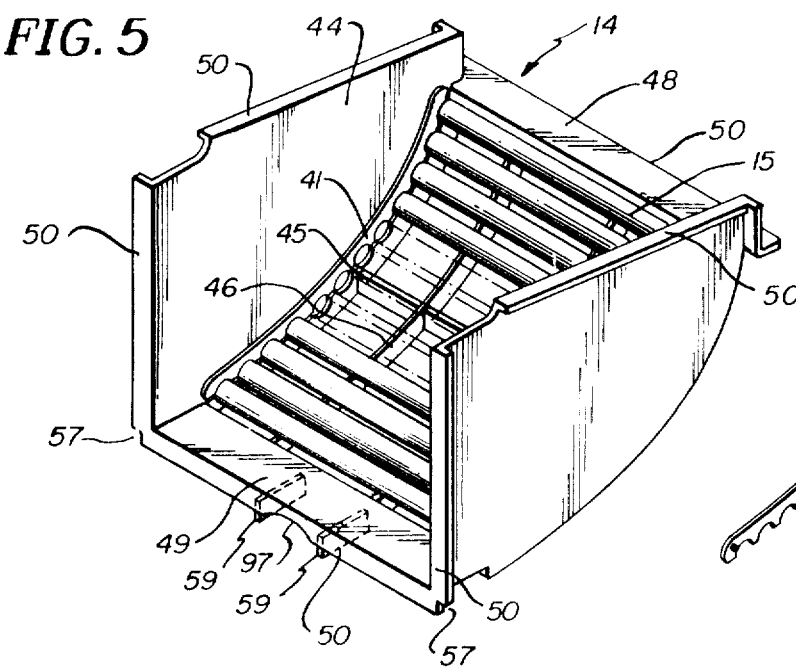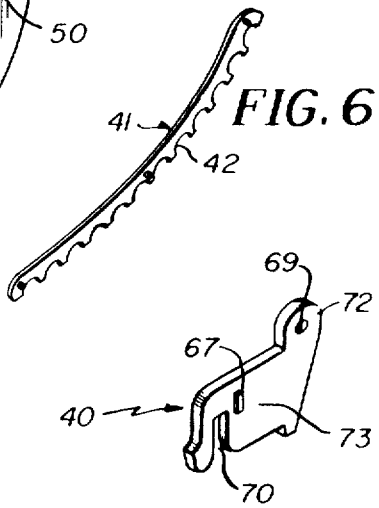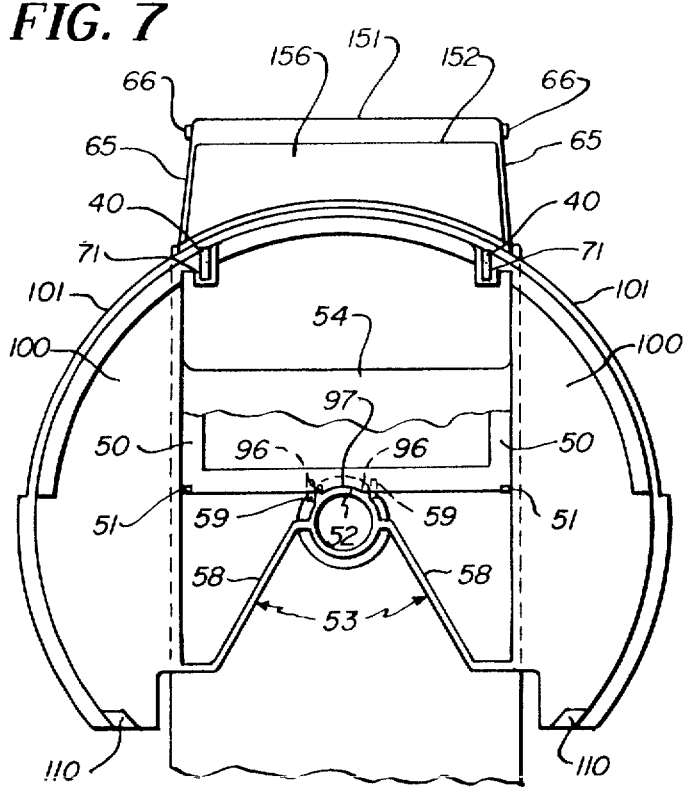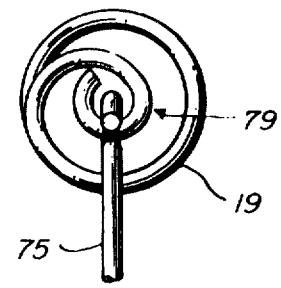

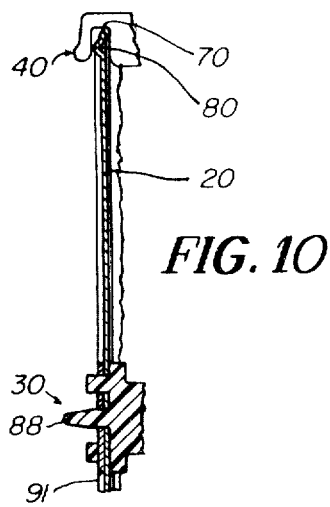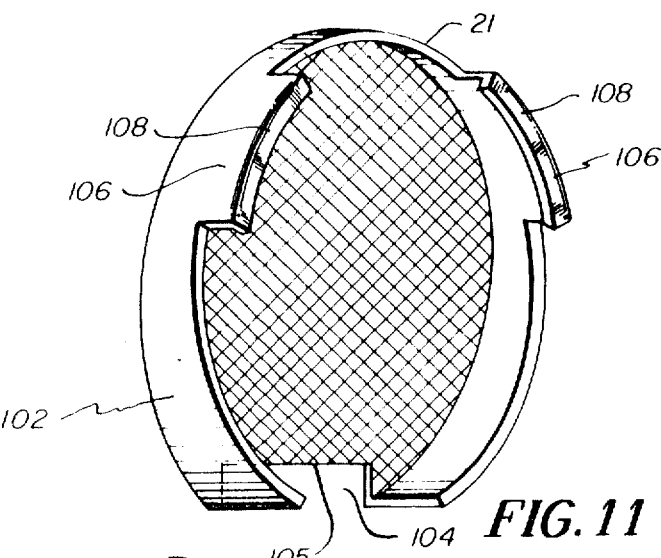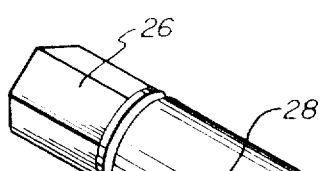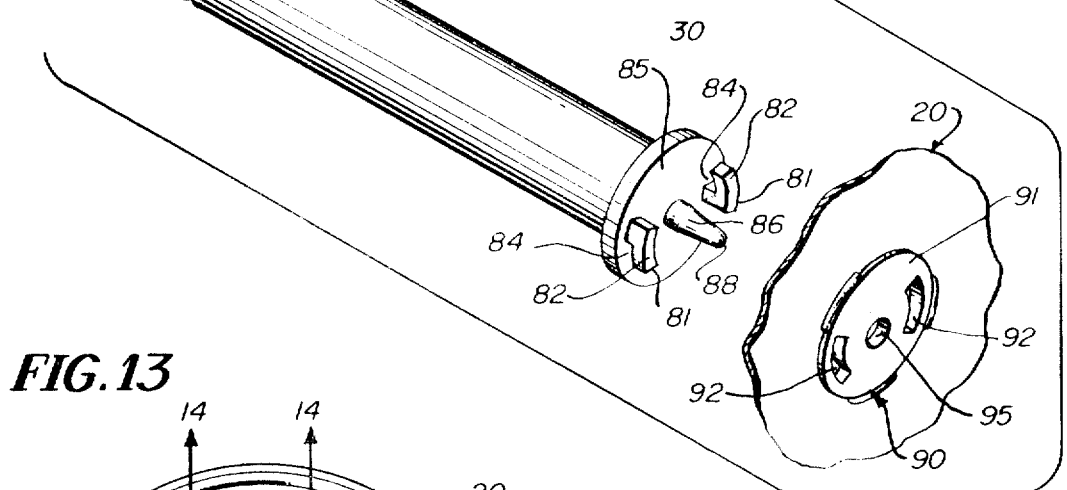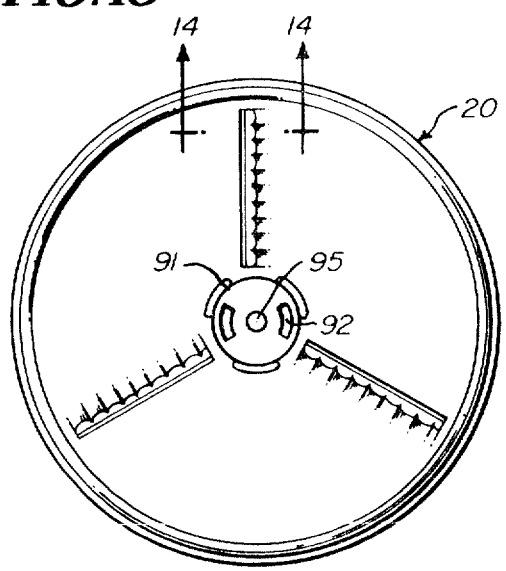

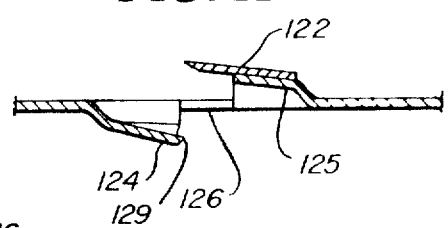
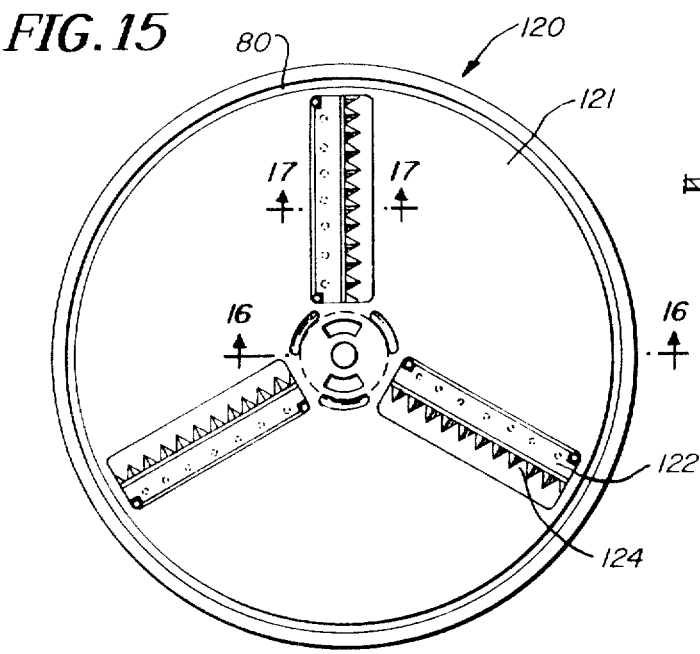
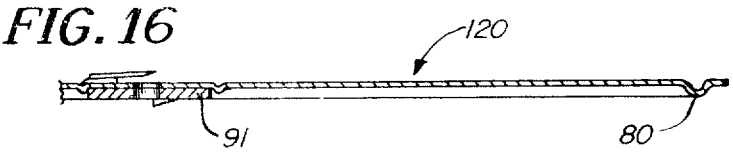
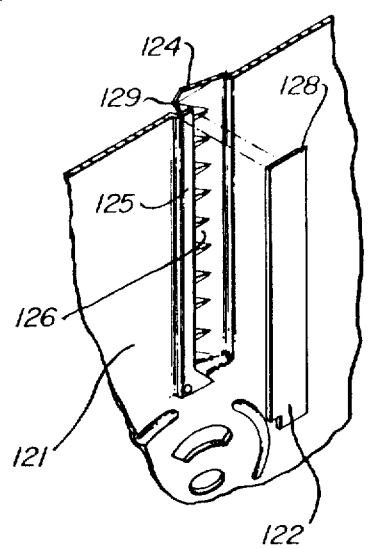
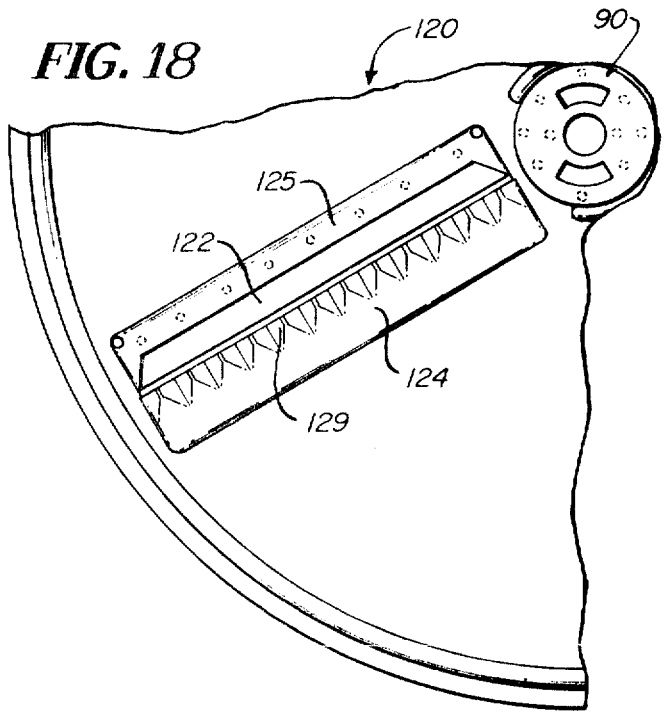

INVENTORS
SAMUEL J. POPEIL
RAYMOND POPEIL
BY Dominik, Knechtel & Godula
ATTYS.

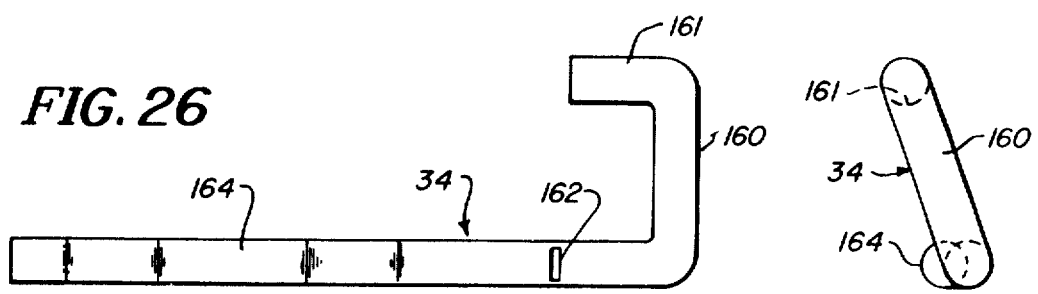
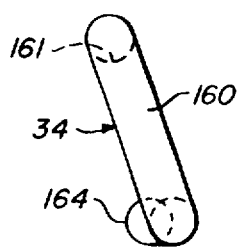
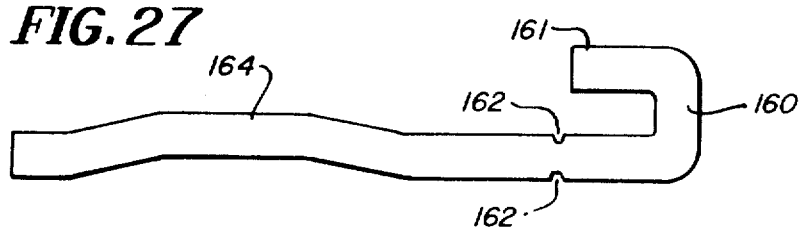
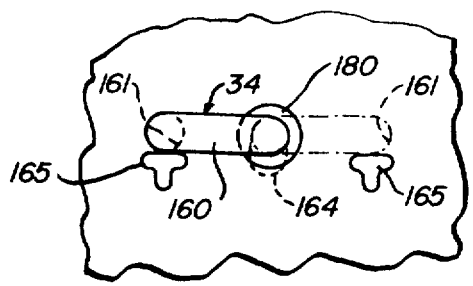
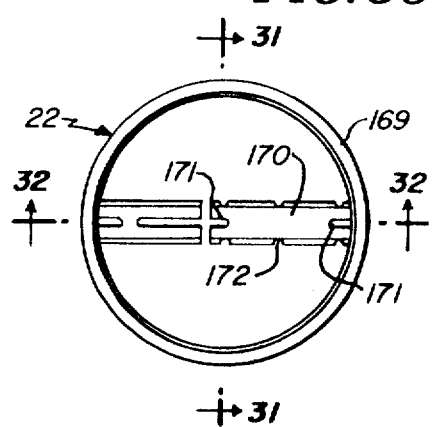
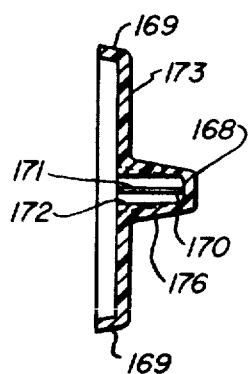
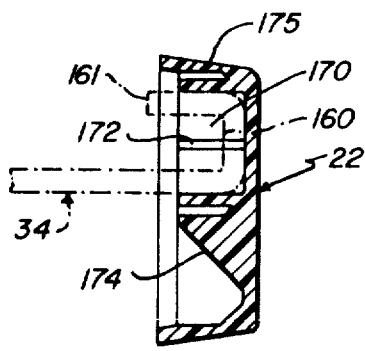
INVENTORS
SAMUEL J. POPEIL
RAYMOND POPEIL

FOOD-CUTTING MACHINE

The present invention relates to a food-cutting machine for slicing and shredding foodstuffs and having a semiautomatic feed. Additionally, the invention contemplates a reversible blade and a structure including a bayonet fastener for securing the blade in place.

BACKGROUND OF THE INVENTION

Food slicers with a rotary blade and hopper feed directed to the blade are known, as illustrated in U.S. Pat. Nos. 1,408,762 and 1,419,499. Such products require two hands to operate, and even then are unsatisfactory for shredding cabbage. More recently, as illustrated in U.S. Pat. No. 2,528,381, commercial devices have been made in which numerous blades may be employed to create a wide variety of cutting patterns. This requires a substantial inventory of blades. Even in the unexpired patent literature, such as illustrated by U.S. Pat. No. 2,807,302, no suggestion appears of reversible blades which halve the inventory of blades required for a variety of cutting patterns. Additionally, even the more exotic commercial type food slicers such as illustrated in more recently issued U.S. Pat. Nos. 2,994,255 and 3,075,564 do not disclose the use of an automatic feed, much less a semiautomatic feed to permit the safe operation with one hand on a rotating handle.

OBJECTS OF INVENTION

In view of the foregoing, it is a principal object of the present invention to provide a food-cutting machine with a semiautomatic feed which permits singlehanded safe operation once the foodstuff is placed in the hopper. Another related advantageous objective flows from the use of the automatic feed disclosed; namely, the ability to fine-cut cabbage in a fast and efficient manner and without exposing the fingers to a cutting blade.

It is another significant object of the invention to provide a food-cutting machine with reversible rotary discs to the end that four separate types of cuts can be made with only two discs, each face of the disc presenting a different cut. Each reversible disc may be economically fashioned from a single sheet of stock, and due to a bayonet fastener on the mount, they are readily reversible so that one side of a disc, for example, may slice, whereas the other side performs a ripple cutting function.

Still another object of the present invention is to provide a food-cutting machine with a semiautomatic feed which has a deflector and base structure proportioned and oriented to cooperate with a kitchen bowl to direct the sliced or shredded material into a bowl in a confined area, again without the need of placing the fingers in contact with or close to the rotating disc.

Still another object of the present invention looks to the provision of a food-cutting machine with semiautomatic feed which omits independent small parts for fastening the reversible disc in position, or in fastening the deflector in position.

Yet another object of the present invention looks to the provision of a food-cutting machine with semiautomatic feed in which the operating surfaces are provided with an appropriate finish to the end that wet slices of food such as potatoes, carrots, cucumbers, and the like will not cling to or adhere to the surfaces of the inner surface of the deflector thereby clogging the unit and requiring intermittent stopping for cleaning.

Still another and important object of the present invention is to provide a food-cutting machine with semiautomatic feed in which all of the principal parts are readily removable, again without disassembling or the use of small fastening elements, for the purpose of washing, cleaning, and facilitating economic manufacture and assembly from plastic molded parts.

SUMMARY OF INVENTION

The invention stems in part from the discovery that, particularly with foodstuffs like cabbage, any hopper or chute with a semiautomatic or even manual feed presents an undue amount of friction to the feeding of the foodstuffs into the rotating disc. With the commercial units where a horizontal tubular feed is employed, a complex feed construction is required, and there is still a danger to the hands of the user. By employing a pusher which has a coacting spring member to urge the same towards the rotating disc, in combination with a plurality of rollers in a conveyorized hopper, the friction of the foodstuff passing through the hopper is minimized. Thus extensive spring loading for a pivotal pusher or automatic feed mechanism is minimized. In addition, a deflector is secured to the outer upper portion of the housing and masks the operative portion of the rotating disc from inadvertent finger contact. The deflector also directs the foodstuffs into a bowl which is easily accommodated in nesting engagement with the base. A unitary reversible bayonet fastener is provided on a drive shaft and proportioned to self-energizingly engage the rotating disc. The removable attachment is maintained by means of a spring-disc support member. Such a construction further permits the use of a reversible disc which has different cutting patterns on its two faces without the use of any additional parts for securing the disc to the rotating drive shaft. The hopper mechanism nests within the main housing and can be readily removed for cleaning. The rotary cutting discs and deflector are also readily removable for cleaning.

Another feature of the invention, as indicated above, is to provide a reversible rotary disc construction, which, when one face is presented to the foodstuffs, will perform a slicing function, while when the reverse face is presented to the foodstuffs, a rippled cut may be made. Contemplated within the concept of reversible discs is also another rotary disc in which one face performs a shoestring or julienne cut on the foodstuffs, whereas when the second disc is reversed a grating configuration is presented. Thus four choices are provided to shred cabbage, or lettuce, and provide a fine cut for potatoes and carrots; and in addition grating and julienne or shoestring as well as ripple and even chopping selections are available.

An additional aspect of the invention relates to the suction cup mounting base, and more particularly the crank arm assembly, the suction base knob for adjusting the same, and stop mechanisms to limit the travel of the knob to less than 180°. Additionally, the structure confines the rotation to one direction rendering the securing of the mechanical food cutter to a flat surface a simple twisting action. Further, the parts are so proportioned and oriented that even if the knob is lost or removed, the suction base can still be actuated by rotating a bent extension from the crank shaft.

THE DRAWINGS

For a further understanding of the objects and advantages as well as the inventive concept involved, attention is invited to the accompanying illustrative drawings of a commercial embodiment, in which:

FIG. 5 is a perspective, partially broken view of the hopper illustrating the conveyorized hopper body construction and position and orientation of the conveyor rollers.

FIG. 6 is a perspective view of the roller end support in the same scale as FIG. 5.

FIG. 7 is a front elevation showing the relationship between the deflector and the main housing and the rotating disc.

FIG. 8 is a perspective view of the rotary spring-disc support.

FIG. 9 is a diagrammatic enlarged perspective view of the spring-dog leg coupling.

FIG. 10 is a partially diagrammatic view taken from one end of the rotating disc illustrating the relationship between the disc and the spring-disc support element.

FIG. 11 is a perspective rear view of the deflector.

FIG. 12 is an exploded perspective view showing the relationship between the bayonet disc mount and the self-energizing bayonet lug locks on the drive shaft.

FIG. 13 is a front elevation of a typical disc.

FIG. 14 is an enlarged sectional view of the rotary disc illustrating the cutting element taken along section line 14—14 of FIG. 13.

FIG. 15 is a front elevation of the slicer-ripple disc.

FIG. 16 is a transverse sectional view of the slicer-ripple disc shown in FIG. 15 taken along section line 16—16 of FIG. 15 and shown in enlarged scale.

FIG. 17 is a transverse sectional view of the cutting elements of the slicer-ripple disc shown in FIG. 15 taken along section line 17—17 of FIG. 15 and shown in enlarged scale.

FIG. 18 is an enlarged broken view of the lower left hand corner of the slicer-ripple disc shown in FIG. 15 illustrating in larger scale the specific relationship between the two independent cutting elements and the body of the disc.

FIG. 19 is an enlarged exploded partially broken view of the cutting element shown in FIG. 18 showing the straight blade and offset ripple edge.

FIG. 26 is a front elevation of the base crankshaft employed to raise the suction holding base by means of the suction base connecting link.

FIG. 27 is a top view of the base crankshaft shown in FIG. 26.

FIG. 28 is an end view of the base crankshaft shown in FIG. 26 taken from the right end portion thereof.

FIG. 29 is an enlarged broken view of the main housing taken beneath the upper portion of the crank handle with the suction base knob removed.

FIG. 30 is a bottom view of the suction base knob.

FIG. 31 is a transverse sectional view of the suction base knob taken along section lines 31—31 of FIG. 30.

FIG. 32 is another transverse sectional view of the suction base knob taken along Section lines 32—32 of FIG. 30.

DESCRIPTION OF ILLUSTRATIVE EMBODIMENT

Figure 1:
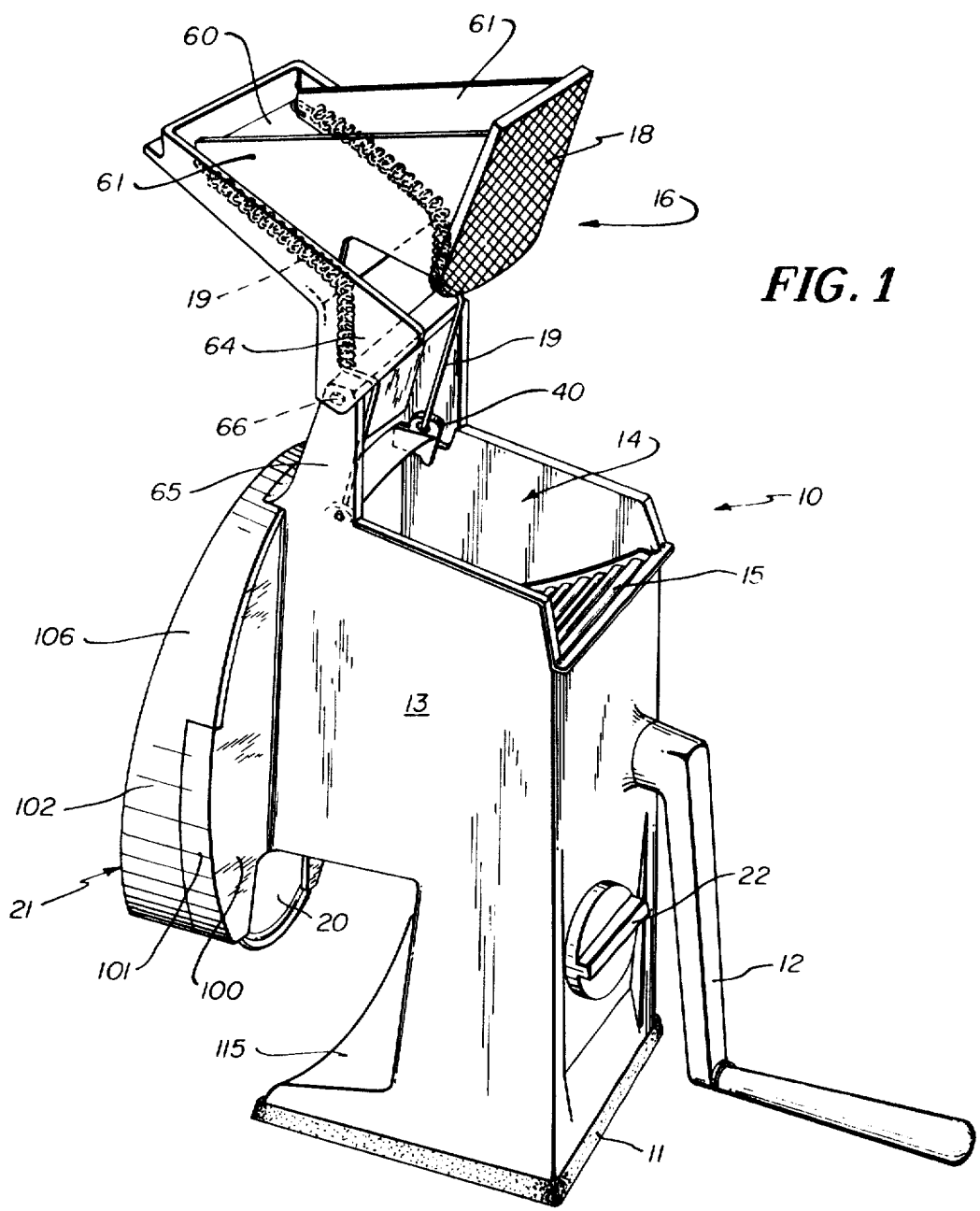
FIG. 1 is a perspective view taken from the rear corner of the food-cutting machine showing the pusher in the open position and revealing the hopper construction.

The general organization of the food cutting machine 10 is illustrated perspectively in FIG. 1. There it will be seen that a suction holding base 11 is at the bottom of the main housing 13 of the unit, and by rotating the suction base knob 22 the same can be secured to a flat surface such as a formica kitchen counter. The crank handle 12 is rotated by the user, and rotates the rotary disc 20 as it is housed within the deflector 21. Foodstuffs such as a quarter section of cabbage (with the heart cut out), or a potato or onion, pressed meats, or even a bunch of carrots, are positioned within the conveyorized hopper 14. Thereafter the foodstuffs will roll into contact with the rotary disc 20 along the conveyor rollers 15 at the bottom of the hopper 14. The food pusher 16 is yieldably urged toward the rotating disc 20 by means of a spring 19. The spring 19 is secured to the spring-disc support 40 which is, in turn, locked to the main housing 13. When activated by turning past the top dead center position of the spring 19, the food pusher face 18 engages the foodstuffs and provides a semiautomatic feed of all the foodstuffs in the conveyorized hopper 14 to the rotating disc 20. It is apparent with the suction holding base 11 engaging the table, and the food pusher 16 and its associated food pusher face 18 urged by means of the spring 19 into engagement with the foods, that only one hand is required for operating the unit. The other hand may be free to hold or position a bowl or other gathering means underneath the bottom of the rotary disc 20. The fingers are left free from exposure to the cutting portion of the rotary disc 20 because of the assist provided by the food pusher 16 delivering an automatic feed to the rotary disc 20.

Figure 2:
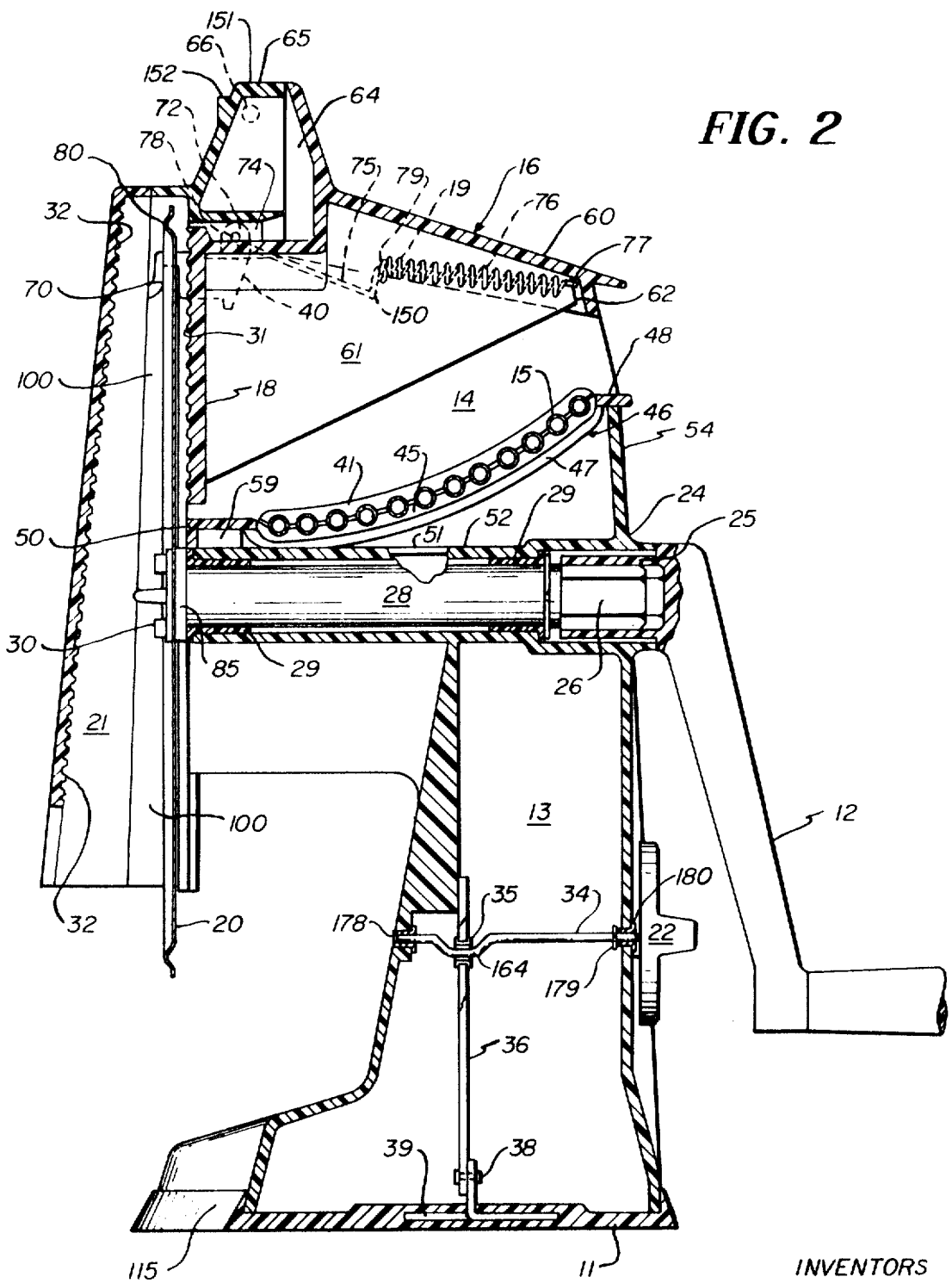
FIG. 2 is a vertical section taken generally through the axis of the drive shaft for the rotary disc.

Referring now to FIG. 2 of the drawings where a transverse partially broken view through a midsection of the subject food cutting machine 10 is shown, it will be seen that the drive mechanism begins with the crank handle 12, and includes a crank-to-shaft hex assembly 24 comprises of a female hex pocket 25 on the crank handle 12, and a hexagonal-shaped end 26 of the drive shaft 28 which positively but removably connects the crank handle 12 with the drive shaft 28. As will be observed, the drive shaft 28 is journaled within the drive shaft sleeve 52 by means of bushings 29 which center the drive shaft 28 for rotation. A drive shaft sleeve gabled truss 53 (see FIG. 7) comprises a pair of plates 58, the latter being connected at one edge to the sleeve, and at the other to the main housing 13. The far end of the drive shaft 28 has a bayonet disc mount 30 proportioned to removably receive the disc 20 for rotation. The drive shaft 28 is secured against longitudinal movement by snapring which fits in the snapring groove shown in FIG. 12.

The conveyorized hopper 14 (best shown in FIGS. 3 and 4 to be described hereinafter) is removable from the main housing 13 for the purpose of cleaning. In the configuration shown in FIG. 2, the pusher face 18 of the food pusher 16 is at its innermost position in close parallel proximity with the rotary disc 20. The food pusher face 18 is held in this position by means of the spring 19. At this point it should be observed that the pusher face 18 has a raised patterned surface 31 to assist in retaining the orientation of foodstuffs as they pass through the conveyorized hopper 14. A raised patterned surface 32 is provided on the inner face of the deflector 21 so that the slices coming off the rotary disc 20 will not cling against the inner face of the deflector 21. The pattern provided on the rejection surface 32 inhibits flat wet contact, and the slices drop readily out the bottom of the deflector 21 into a dish or other receptacle provided at that location.

As discussed above, a suction base knob 22 connects with a base crankshaft 34 journaled in the main housing 13 for rotation. The crank shaft throw 164 of the base crankshaft 34 is secured to the suction base connecting link 36 so that upon rotation of the knob 22 the crankshaft throw 164 when raised will raise the suction base connecting link 36. The connecting link 36 is connected by means of a rivet 38 to the suction base anchor 39. Thus, when the knob 22 is rotated the anchor 39 raises the suction base 11. The partial vacuum created therebeneath firmly secures the main housing 13 and the food-cutting machine 10 to a formica tabletop, or other flat surface upon which the unit is being operated. As will be observed also in FIG. 2, a connecting link guide web 27 is molded in the interior portion of the main housing 13 to provide a guide surface which abuts the upper end of the suction base connecting link 36. The one end of the base crankshaft 34 immediately beneath the connecting link guide web 27 is anchored axially to the housing by means of a closed end eyelet 178 secured in the main housing 13. The suction base connecting link 36 is mounted on the crank throw 34 by means of the crank shaft eyelet 35 which is open ended. At the far end of the base crankshaft 34, where it is secured to the suction base knob 22, it is journaled by means of open end eyelet 179 to the main housing 13, and locked (as will be described in detail hereinafter) longitudinally by means of an E-ring 180.

Figure 3:
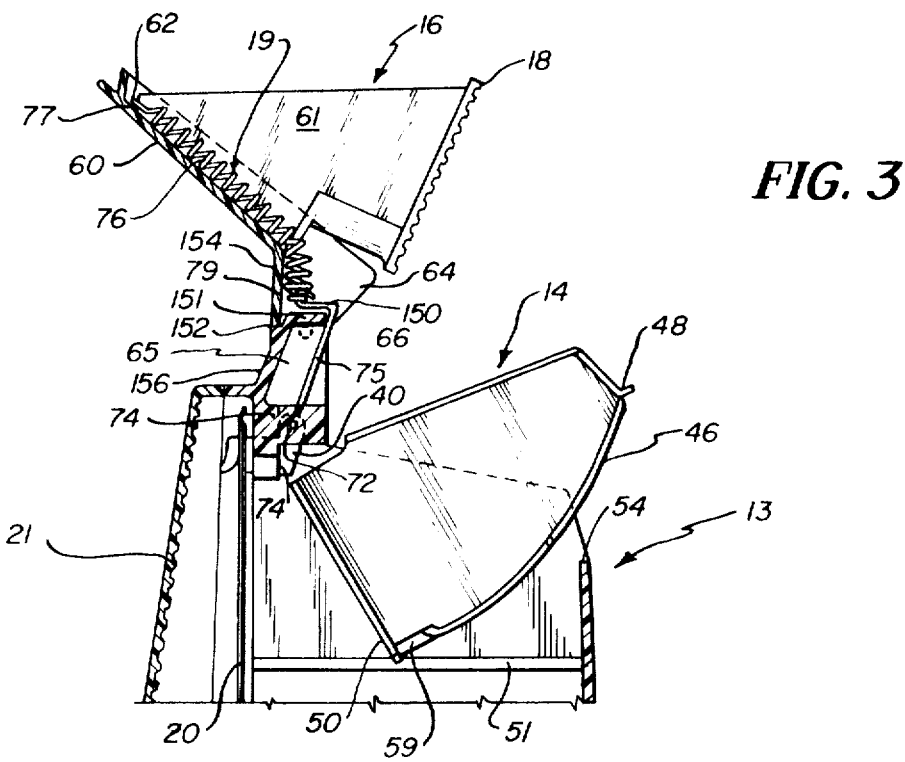
FIG. 3 is a section of the upper portion of the food-cutting machine shown in FIG. 2 illustrating the relationship between the removable hopper and the main housing.
Figure 4:
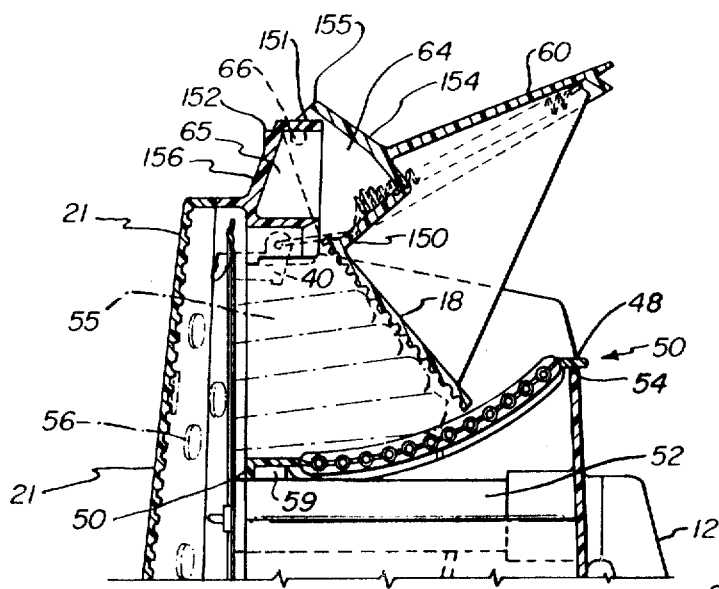
FIG. 4 is a section taken along generally the same section as FIG. 3, but illustrating the pusher in engagement with foodstuffs being delivered to the rotating disc.

The relationship between the conveyorized hopper 14, the main housing 13, and the food pusher 16 is best illustrated in FIGS. 3 and 4, but will be better understood after a brief description of the assembled hopper construction illustrated in FIGS. 5 and 6. There it will be seen that some 12 rollers are journaled for rotation in a crescent-shaped path by means of the upper roller end support 41 which has a curvilinear body portion defining 12 rounded roller pockets 42 at the bottom, a portion thereof to fit atop the roller ends as illustrated in FIG. 5. The upper roller end support 41 (of which there are 2) is fixed to the hopper sidewall 44 by gluing, snap fitting, or other expedient and coacts with the lower roller cradle 45 (of which there are 2) molded into the bottom of the hopper sidewall 44 to journalingly engage the 12 rollers 15. As will be further observed, the hopper 14 has a pair of curved ribs 47 molded therein, and secured at one end to the hopper removal ledge 48 and at the other end to the hopper cutting support 49. As will be further observed in FIG. 5, the conveyorized hopper 14 has a continuous flange about its upper edge, sides, front edge, and base defining a hopper flange 50.

Turning now to FIGS. 3 and 4, it will be seen that if the conveyorized hopper 14 has been removed for cleaning (such as illustrated in FIG. 3) it is reinserted into the main housing 13 by first raising the food pusher 16 until it is in the far open position. Thereafter the forward portion of the conveyorized hopper 14 is positioned within the main housing 13. The forward portion of the flange 50 locks above the hopper support ribs 51 which are molded on the sidewalls of the main housing 13. The front edge of the hopper flange 50 slides along the support ribs 51 guided by the support rib notches 57. At the same time the rear edge of the flange 50 which is slightly beneath the hopper removal ledge 48 rests atop the hopper removal ledge support edge 54 of the main housing 13 and thus secures the conveyorized hopper 14 in place. In operation, illustrated in FIG. 4, the food pusher 16 is lowered and the spring 19 begins to pull the same downwardly urging the pusher face 18 against the foodstuffs 55 (here illustrated as a bunch of carrots) which are thrust forwardly into yieldable engagement with the disc 20. As the disc 20 is rotated the food slices 56 are thrown off, and diverted by means of the deflector 21 downwardly into a convenient receptacle such as a salad or mixing bowl.

When the crank 12 is rotated and transmits torsional effort through the drive shaft 28 to the cutting disc 20, a reaction occurs as the cutting elements engage the foodstuffs passing through the hopper 14. This reaction requires a coactive support between the hopper 14 and the main housing 13. As illustrated particularly in FIGS. 5 and 7, a pair of side thrust stops 59 are molded in the bottom of the hopper 14 as an integral portion of the hopper cutting support 49. Between the side thrust stops 59 and a channel is defined, and a sleeve clearance recess 97 is provided to rest atop the drive shaft sleeve 52. In addition, it will be particularly noted in FIG. 7, that a pair of longitudinal side thrust runners 96 are molded along the upper portion of the sleeve 52 and proportioned to be flankingly engaged by the side thrust stops 59 of the hopper 14. Also shown in FIG. 7, the coaction between the hopper support ribs 51 and the support rib notches 57 forms part of the locating and positioning of the hopper within the body. But additionally, the strength afforded by resisting the torsional reaction due to the coaction of the side thrust stops 59 and the side thrust runners 96 is such as to render the unit quite secure against the torsional reactions of cutting foodstuffs, and yet readily moldable from a variety of plastics in an economic manner.

The food pusher 16 has on its upper portion a top cover 60 (see FIGS. 1 and 2) which serves as the cover for the conveyorized hopper 14 when the food pusher 16 is in the down position. A pair of pusher gussets 61 are integrally molded with the food pusher 16 and terminate at one edge on the pusher top cover 60, and the other edge at the pusher face 18.

Particularly as noted in FIG. 2, a pusher cover spring notch 62 is provided at the end of the pusher gusset 61 remote from the pusher head 18 and adjacent the cover 60. The pusher cover spring notch 62 receives the spring hook 77 of the spring 19 and secures the same in place. As will be observed in FIG. 2, the spring 19 under tension urges the pusher top cover 60 into its closed position over the conveyorized hopper 14. Alternatively, when the food pusher 16 is turned to its full up or open position as illustrated in FIG. 3, the spring 76 still remains secured in the spring notch 62.

The food pusher 16 is secured to the housing 13 by means of the coaction between the pusher cover pivot wings 64 and the upstanding mounting stud extensions 65 on the main housing 13. The upstanding mounting stud extensions 65 have an integrally molded pivot stud 66 which coacts with a pusher pivot stud hole 68 molded into the pusher cover pivot wings 64 of the food pusher 16. In assembly, the pusher cover pivot wings 64 are spread slightly and thereafter snap-actingly engage the pivot studs 66 in flanking engagement therewith.

The spring-disc support 40 plays a key role in the support of the disc 20, as well as serving in cooperation with the pusher cover spring notch 62 of the food pusher 16 to anchor the pusher springs 19. The part itself is illustrated in FIG. 8 where it will be seen that the spring-disc support 40 is a flat member having a spring mounting hole 69 in diagonally offset relationship with the rotary disc positioning notch 70. The body portion 73 fits through the mounting aperture 71 at the front face of the main housing 13. The boss 72 which surrounds the spring mounting hole 69 serves to abuttingly engage the stop 74 (see FIG. 2) which depends from the mounting stud extensions 65. In addition, the locking projections 67 prevent removal of the spring-disc support 40 by rearward disengagement from the mounting aperture 71.

As will be particularly noted in the sequence of FIGS. 2, 4, and 3, the action of the pusher springs 19 tends to pull the spring-disc support 40 out of its recess within the main housing 13 against the disc 20, when the food pusher 16 is in the closed position shown in FIG. 2. This action is resisted by the projection 76. As the food pusher 16 is raised to the position shown in FIG. 4, the pivotal action of the spring tends to arise the spring-disc support 40 and more securely hold it within the mounting aperture 71. In the final configuration shown in FIG. 3 where the tension of the pusher springs 19 holds the food pusher 16 in the open position, the action is all upwardly. The spring-disc support 40 therefore serves to provide a rotary disc positioning notch 70 in the positions as shown particularly in FIG. 7. A generally trapezoidal support is thus provided for the rotating disc 20 by the two spring-disc supports 40, when taken in combination with the disc periphery limit stops 110. Additionally, the spring-disc support 40 anchors the pusher spring 19 for its operation, and positionably orients the same.

The pusher spring 19 includes a dog leg 75 and a spring 76. A spring hook 77 is provided at the remote end of the spring 76 which engages the pusher cover spring notch 62 beneath the pusher top cover 60. At the opposite end of the dog leg 75, a dog leg hook 78 is provided to engage the spring mounting hole 69 of the spring-disc support 40. The dog leg 75 and the spring 76 are interconnected by means of a coupling 79 (see FIG. 9). The alignment of the pusher spring 19 is achieved by securing the end of the dog leg 75 and spring 76 respectively in the mounting hole 69 and spring notch 62. The spring 76 will thus be positioned nestingly at the intersection of the pusher gussets 61 and the underside of the pusher cover top 60. This relationship is best shown in FIG. 1. The spring 76 thereby is permitted to slide upwardly and downwardly slightly, as well as adjust laterally against the gussets 61 as illustrated in the sequential FIGS. 2, 3, and 4.

Another feature of the food-cutting machine 10 resides in the cooperative relationship between the food pusher 16 and main housing 13 facilitated by the specific construction of the pusher springs 19 to hold the pusher open in the configuration shown in FIG. 3, and urge the same into the closed position as shown in FIG. 4. The construction relies significantly on the dog leg bend 150 of the dog leg 75 of the pusher spring 19. As shown in FIG. 3, the dog leg bend 150 is proportioned to clear the mounting stud extension cross brace 151 of the main housing 13. Depending from the mounting stud extension cross brace 151 is the label plate 156, also an integral part of the main housing 13. At a midposition on the label plate 156 is a pusher stop 152 in the form of a notch or ridge on the label plate 156. The pusher stop 152, particularly as illustrated in FIG. 3, abuttingly engages the pusher cover extension 154 at the pusher cover extension stop edge 155. Thus in the full open position as illustrated in FIG. 3, the spring 76 is pulling upwardly against the spring-dog leg coupling 79. This action yieldably urges the pusher cover extension stop edge 155 against the pusher stop 152. When the pusher top cover 60 is pivoted to urge the pusher face 18 toward the foodstuffs, toward the position shown in FIG. 4, the spring 76 then firmly pulls via the pusher cover spring notch 62 at the end of the pusher gusset 61 and urges the pusher face 18 toward the rotating disc 20. In the full down position, as observed best in FIG. 2, the pusher cover extension 154 blends in with the mounting stud extension cross brace 151 and label plate 156 to form a beamlike member traversing the space between the mounting stud extensions 65. Thus the action of the pusher springs 19 with their cooperative structural elements on the food pusher 16 and the main housing 13 achieves the semiautomatic "hands-off" feed as the foodstuffs 55 roll atop the conveyor rollers 15.

The disc 20 as shown in FIG. 2 and FIG. 16 has a circular rib 80 the depth or thickness of which is proportioned to snugly fit within the rotary disc positioning notch 70 of the spring-disc support member 40. The cooperation between the circular rib 80 of the disc 20 and the spring-disc support 40 is coordinated with a further element; namely, the bayonet disc mount 30 best illustrated in FIG. 12. There it will be seen that the bayonet disc mount 30 contemplates the bayonet lugs 81 each having bayonet lug locks 82 defining the bayonet notches 84 between the base of the lug locks 82 and the drive shaft collar 85 molded onto the end of the drive shaft 28. A drive shaft centering pin 86 is provided along the central axis of the drive shaft 28 and positioned midway between the bayonet lugs 81. Correspondingly the disc 20 has a spacer bayonet lock 90 which comprises a spacer 91 secured to the center of the disc 20. The spacer bayonet lock 90 has opposed crescent through holes 92 and a centering hole 95 proportioned to receive the tapered drive shaft centering pin 86 of the drive shaft 28.

Thus in operation the disc 20 (assuming no disc on the unit) is first positioned with the circular rib 80 nested within the rotary disc positioning notch 70 of the spring-disc support 40. Thereafter the spacer bayonet lock 90 of the disc 20 is brought closer to the drive shaft collar 85 on the drive shaft 28 until the bayonet lugs 81 are positioned to extend through opposed crescent through holes 92 of the spacer bayonet lock 90. This action is assisted by the centering pin taper 88 of the drive shaft centering pin 86 first seeking and guiding centeringly its way through the centering hole 95 of the spacer bayonet lock 90. Thereafter, turning the disc 20 by means of the rotation of the crank handle 12 will always drive the bayonet lug notches 84 of the bayonet lugs 81 against the ends of the crescent through holes 92. The harder one turns the handle 12 the more skin friction will exists between the circular rib 80 on the periphery of the disc 20 and the rotary disc positioning notch 70, thus creating some drag and further securing the crescent through holes 92 in engagement with the bayonet lug receiving notches 84 of the bayonet lugs 81. Further, upon reversing the disc 20, it will be observed (with particular reference to FIG. 10) that symmetry is maintained between the spacer 91 of the spacer bayonet lock 90 between the center of the disc 20 and the circular rib 80 at the periphery of the disc 20. Irrespective of which face of the disc 20 engages the foodstuffs fed through the conveyorized hopper 14, the disc 20 itself will be positively and self-energizingly locked by the bayonet disc mount assembly 30. In addition, the coaction of the circular rib 80 with the rotary disc positioning notch 70 of the spring-disc support 40 is equally effective upon reversal of the disc 20.

The mounting of the food deflector 21 is accomplished in a simple slip-fit engagement. As will be seen from FIG. 7, the deflector 21 contemplates a connection with the body backplate 100 which extends laterally from the main housing 13. At its upper portion, the body back plate 100 has a backplate rim 101. Correspondingly, as shown in FIG. 11, the deflector 21 is formed with a generally cylindrical food deflector rim 102 having a food deflector opening 104 at the bottom portion thereof and a forwardly facing discharge notch 105. Locking portions 106 appear as spaced extensions from the food deflector rim 102, and are provided with locking lugs 108 which are proportioned to engage the lower portion of the backplate rim 101 of the body backplate 100.

Further to coordinate the precise positioning of the disc 20, disc periphery limit stops 110 (see FIG. 9) are molded on the backplate rim 101 of the body backplate 100 to engage the circular rib 80 of the disc 20 to prevent deflection.

Before describing the two rotary cutting discs in detail, it will be seen that the food-cutting machine 10 is provided with a means for yieldably delivering the foodstuffs through the conveyorized hopper 14 by means of a semiautomatic pusher 16, and rotating the disc 20 with one hand by means of the crank handle 21. A bowl foot 115 is provided at the front portion of the suction holding base 11 to the end that a salad bowl, or kitchen bowl, can be readily positioned beneath the food deflector 21 to receive all of the slices that are cut by the disc 20. The bowl is then easily removed from beneath the deflector 21. During the entire time the food-cutting machine 10 is held securely to the work table by means of the suction holding base 11.

In FIG. 15 the slicer-ripple disc 120 is shown which includes its disc body portion 121 and the circular rib 80 at the periphery which is common to all discs 20. With the slicer-ripple disc 120 provision is made for three straight blades 122, and three oppositely oriented ripple edges 124. Each of the straight blades 122 (see FIG. 19) is welded or otherwise secured to a stepped weld area 125 which is formed into the disc 121. The stepped weld area 125 also defines a slice ejector slot 126 between the cutting elements 122, 124. The straight blade 122 is provided with a front knife edge 128, whereas the ripple cutter 124 is provided with a ripple edge 129. It will be appreciated, particularly from FIGS. 17 and 19, that as the disc is reversed, alternatively the straight edge 128 is presented to the foodstuffs, thus making thin slices, or the rippled edge 129 is presented to the foodstuffs cutting ripples such as pickles, cucumber slices, and the like.

Figure 20:
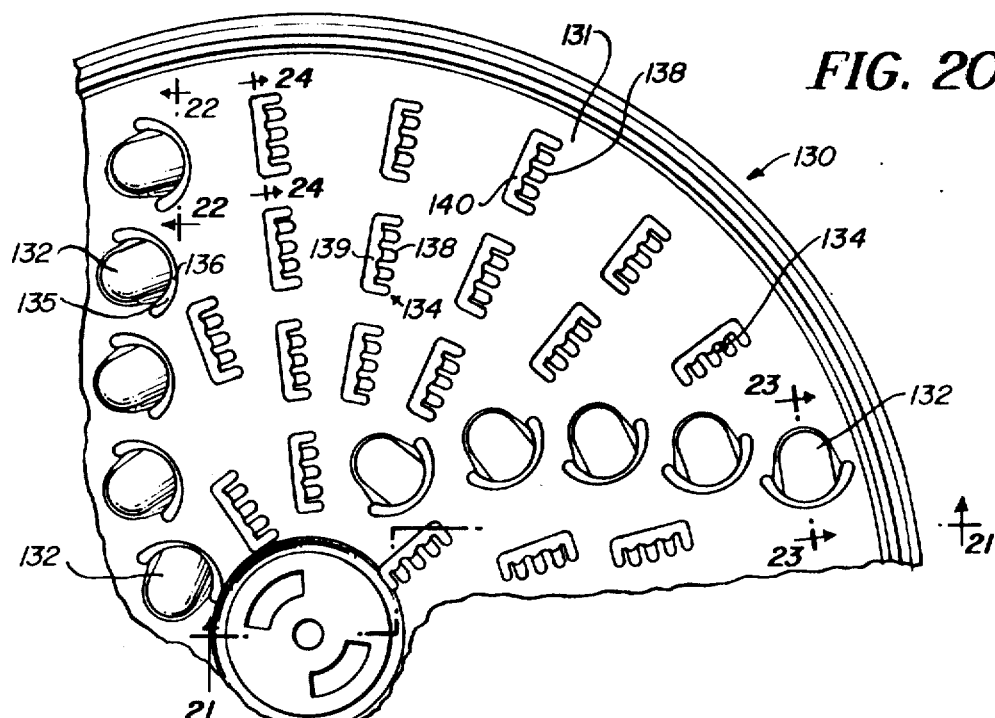
FIG. 20 is an enlarged broken view showing one quadrant of the grater-julienne disc which is formed to cut juliennes on one face, and grate on the other face.
Figure 21:
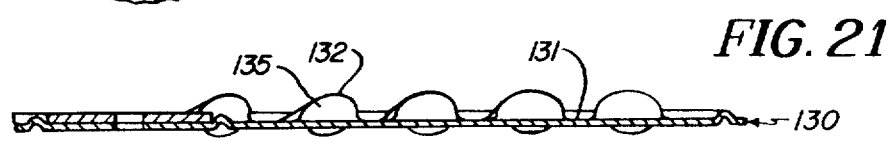
FIG. 21 is a transverse sectional view taken generally along section line 21—21 of FIG. 20 illustrating the approximate spacial relationship and offsetting relationship between the grater elements and the julienne elements.
Figure 22:
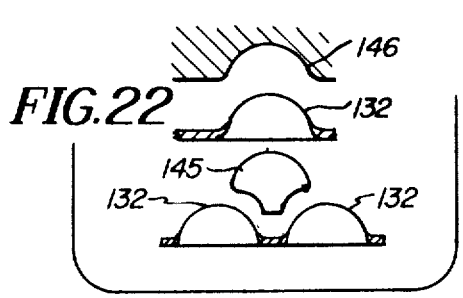
FIG. 22 is an enlarged transverse section of the julienne element taken along section line 22—22 of FIG. 20.
Figure 23:
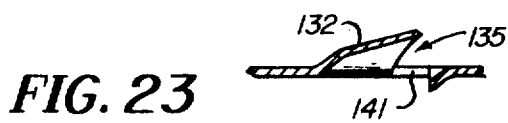
FIG. 23 is a transverse section of the individual julienne element taken along section line 23—23 of FIG. 22.

The ripple cutter 124 during the forming of the same, desirably includes a shear-form action which forms a sharp cutting edge. The grater-julienne disc 130 is best illustrated in FIG. 20 where it will be seen that the grater-julienne disc plate 131 has been punched to form a plurality of uniformly staggered julienne cutters 132 and a plurality of offsettingly spaced graters 134. Shown here are ten of the staggered radially spaced julienne cutters 132, and alternatively one, two, three, and four radially oriented graters 134. Specifically, as seen in FIG. 23, the julienne cutters 132 are punched leaving a julienne ejector 135 which permits the foodstuffs to pass therethrough in long sticks, such as sticks of carrots, potatoes, and the like. The successive sets of julienne cutters 132 are offset to radially overlap the gaps between the preceding sets of julienne cutters 132. The cross section of the julienne cut 145 as well as the cross section of the uncut portion 146 are shown in their relative relationship in FIG. 22. The julienne cutting edge 136 may optionally be formed with a taper which faces the julienne ejector 135. Alternatively, the same when punched from the proper selection of sheet for the plate 131 will shear-form along a diagonal sufficient to define a good cutting edge.

Figure 24:
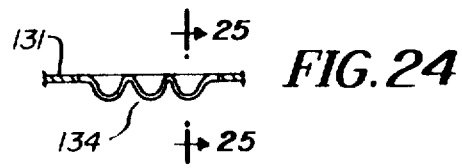
FIG. 24 is an enlarged transverse sectional view of the grater element taken along section line 24—24 of FIG. 20.
Figure 25:
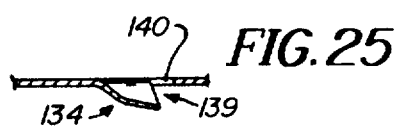
FIG. 25 is an enlarged transverse sectional view of the individual convoluted cutting portion of the grater element taken along section line 25—25 of FIG. 24.

The graters 134 as shown in FIGS. 24 and 25 provide three deep grater ripples 138 and leave a grater ejector 139 of sufficient depth to permit the passage of fine foodstuffs without clogging. Also will be noted that, in plan view, a grater relief gap 140 is also defined, leaving a substantial open area (See FIG. 25) through which foodstuffs can pass in a self-cleaning smooth flow. Normal punching operations are sufficient to provide the configuration of the three-deep ripple construction with the grater ejector 139 and grater relief gap 140 as shown.

As shown in FIG. 12, a stress relief locator is embossed in the plate portion 121, 131 of the cutting disc 120, 121. With the ripple-straight cut disc 130, the stress relief locators 98 are shown in the form of a crescent-shaped indented members. With the julienne and grater disc 130, the stress relief locator 98 is shown in the form of partially interrupted ring. The purpose of the stress relief locator 98 in both instances is the same; namely, to absorb or shrink a portion of the sheet material from which the entire disc is formed, and to draw the same centrally thereby rendering the disc flat and relieving stresses, and to additionally provide a locator for the spacer 91 which forms an integral part of the spacer bayonet lock 90. While the stress relief locator 98 has been shown in two forms, it will be appreciated that the curvilinear or circular orientation is not essential and that, indeed, the same could be in triangular, square, or straight line forms. Significant, however, is the embossing action at the central portion of the disc to take up or shrink the sheet metal which is otherwise stressed by forming operations, and to also provide a locator for the spacer 91.

Another feature of the invention relates to the specific detailed construction of the base crankshaft 34, the suction base knob 22, and the main housing crankshaft stops 165 which coact to simplify the action of the suction holding base 11. As noted in FIG. 26, the base crankshaft 34 is an elongate rod formed from circular stock with a knob mounting arm 160 at one end in a J-shaped form. The far end of the knob mounting arm 160 comprises a knob mounting arm stop 161, a reversely bent portion of the arm 160. An E-ring notch 162 is provided for the E-ring 180 to secure the base crankshaft 34 to the main housing 13 as illustrated and described in connection with FIG. 2.

Particularly as noted with reference to FIGS. 27 and 28, the crank throw 164 is offset approximately 65° from the knob mounting arm 160. This offset becomes significant when the relationship with the main housing crankshaft stop 165 is observed, as shown in FIG. 29. There it will be seen that the crank throw 164 extends slightly downwardly when the base crankshaft 34 is positioned with the knob mounting arm stop 161 against the left-hand side main housing crank shaft stop 165. As the base crankshaft 34 is turned by means of the suction base knob 22 clockwise in the direction of the arrow shown in FIG. 29, the crankshaft throw 164 raises the suction base connecting link 36 and, of course, the suction holding base 11. This action is opposed by the stretching of the suction base 11, and therefore after the base crankshaft 34 has been rotated beyond the high point of the arc of the crank throw 164, the tension action on the suction base connecting link 36 will pull the knob mounting arm 160 downwardly to the right until the knob mounting arm 161 engages the right hand main housing crankshaft stop 165. Thus the rotation of the suction base knob 122 is confined to an arc of approximately 180° by means of the coaction between the knob mounting arm stop 161 and the main housing crankshaft stops 165, in combination with the 60° offset between the crank throw 164 and the knob mounting arm 160.

It will be appreciated that, upon observing the construction as shown in FIG. 29, a pair of pliers or even a strong finger grip on the knob mounting arm 160 will permit the rotation of the base crankshaft 34 to activate the suction holding base 11. Thus the mounting for the suction base knob 22 need not be one stressed to accommodate major pulloff forces, but only to accommodate the rotation of the base crank shaft 34. As observed in FIG. 30, the suction base knob 22 is circular in nature, and (see FIG. 31) includes a finger hold 168 in the form of an elongate grip. Interior of the finger hold 168, and defined by finger hold ends 175 and the finger hold sidewalls 176, is knob mounting arm slot 170. Within the knob mounting arm slot 170, and offset at the end portions thereof, are a pair of knob mounting arm locating ribs 171. Flanking the position of the knob mounting arm 160, are a pair of knob mounting arm locking ribs 172. The press-fit relationship between the knob mounting arm 160, and the knob mounting arm locating ribs 171 and the knob mounting arm locking ribs 172 is sufficient to secure the suction base knob 22 to the knob mounting arm 160 of the base crank shaft 34. For additional security, however, it is contemplated that a roughened surface may be formed on the knob mounting arms 160. The balance of the suction base knob 22 includes the knob rim 169 around the periphery of its circular body portion 173, and as observed in FIGS. 30 and 32, a stiffening gusset 174 opposite the knob mounting arm slot 170 to offset the thrust of the insertion of the knob mounting arm 160 within the knob mounting arm slot 170 against the knob mounting arm locating ribs 171. The entire assembly, therefore, contemplates a press-fit suction base knob relationship with the base crank shaft 34 without employing additional parts for securing the same in place. In operation, the advantageous feature is the limit of travel to approximately 180° of rotation, with the assurance that rotation in the wrong direction is precluded by the combined action of the main housing crank shaft stops 165 with the knob mounting arm stops 161, and the offset relationship of 65° between the crank throw 64 and the knob mounting arm 160.

In review, it will be seen that a food-cutting machine has been described which permits four types of cutting actions with only two flat discs which are easily stored in the kitchen. A semiautomatic feed is provided with a plurality of conveyor rollers at the bottom of the conveyorized hopper which permits high speed and safe feed to the rotating cutting discs. A deflector on the housing directs the foodstuffs in a neat downward flow into a bowl or other receptacle provided to receive the cut food. The discs are quickly interchangeable or reversible without the provision of loose parts which can become lost in the process. Additionally, the bayonet fastener which secures the rotating disc to the drive shaft is self-energizing, and cooperates with the elements of the shape necessary for cutting heavier foodstuffs, particularly such as slicing swiss cheese, prepared meats, such as ham loaf, and the like. All of the elements are readily removable for cleaning and good sanitary practice. The discs, in addition, are formed with a pattern of cutting elements to maximize their available capacity.

Although several embodiments of the invention have been shown and described in full here, there is no intention to thereby limit the invention to the details of such embodiments. On the contrary, the intention is to cover all modifications, alternative embodiments, usages and equivalents of the food-cutting machine with semiautomatic feed as fall within the spirit and scope of the invention, specification and appended claims.

What is claimed is:

1. A food-cutting machine with semiautomatic feed comprising, in combination, a main housing, a drive shaft journaled for rotation transversely through the main housing, a conveyorized hopper having opposed sidewalls, a plurality of conveyor rollers at the bottom of the hopper and between the sidewalls journaled for rotation to rollingly pass foodstuffs along their engaged surfaces, a food pusher pivotally mounted on the food-cutting machine above the drive shaft and proportioned to nest in and pass through the hopper, yieldable means for urging the pusher forwardly through the hopper, and a rotating disc engaged by the shaft positioned to receive and cuttingly engage foodstuffs which are delivered thereto by means of the yieldably urged pusher within the hopper.

2. In a food-cutting machine with semiautomatic feed as defined in claim 1, a bayonet fastener at the end of the rotating drive shaft, said bayonet fastener being characterized by a pair of upstanding members with offsetting lugs, said rotating disc having a center portion with lug receiving through holes, the latter being engaged by the offset overlapping lugs.

3. In the food-cutting machine of claim 2, centering means comprising a tapered extending pin at the end of the drive shaft, and means defining a centering pin receiving hole at the center of the rotating disc and flanked by the lug receiving through holes.

4. In the food-cutting machine of claim 1, the improved means for supporting the disc and securing the food pusher for yieldably urging the pusher through the hopper, comprising, a spring-disc support having a body with a disc notch and spring engaging aperture, means defining an opening in the housing through which the body of the spring-disc support passes in engagement therewith, stop means on the spring disc support body proportioned to abut the housing, a spring secured at one end to the spring-engaging aperture and the other end to the pusher, and rib means at the periphery of the disc proportioned to rotate within the disc notches.

5. In the food-cutting machine of claim 4, said rib means and notch being proportioned to provide a common orientation for the disc when reversed.

6. In the food-cutting machine of claim 1, said pusher having a cover proportioned to overlie the hopper, a pusher face, a generally triangular member joining the cover and pusher face, pivot wings extending from opposed corners of the cover, pivot mounting extensions extending upwardly from the housing at opposed sides of the hopper, and pivot means coacting with the wings and extensions pivotally engaging the pusher and housing.

7. In the food-cutting machine of claim 4, said pusher having a cover proportioned to overlie the hopper, a pusher face, a generally triangular member joining the cover and pusher face, pivot wings extending from opposed corners of the cover, pivot mounting extensions extending upwardly from the housing at opposed sides of the hopper, and pivot means coacting with the wings and extensions pivotally engaging the pusher and housing.

8. In the food-cutting machine of claim 1, a cage joining the opposed sides of the hopper, a lower roller end support formed in the hopper sidewall having a plurality of roller receiving elements, and an upper roller end support proportioned for attachment to the sidewall in opposed relationship to the lower roller end support and having opposed roller-receiving elements, both roller end supports extending from the sidewalls and cooperating to journal the rollers therebetween.

9. In the food-cutting machine of claim 4, a cage joining the opposed sides of the hopper, a lower roller end support formed in the hopper sidewall having a plurality of roller-receiving elements, and an upper roller end support proportioned for attachment to the sidewall in opposed relationship to the lower roller end support and having opposed roller-receiving elements, both roller end supports extending from the sidewalls and cooperating to journal the rollers therebetween.

10. A disc for use in the food-cutting machine of claim 1, having, a disc body formed of a metal circular sheet, a rib adjacent the periphery of the body, a central reversible self-energizing fastening means proportioned to coact with the drive shaft of the food-cutting machine, and cutting elements of different configuration oriented on both sides of the disc body whereby differing cuts can be made when the disc is reversed.

11. A food-cutting machine with semiautomatic feed comprising, in combination, a housing, a hopper mechanism proportioned to mount within the housing, a pusher pivotally mounted to pass through the hopper for advancing foodstuffs therethrough, a rotating disc in cutting relationship with the forward portion of the hopper, a drive shaft journaled in said housing, means for rotating said drive shaft, bayonet means for removably securing the disc to the drive shaft, a deflector backplate on the housing, a deflector comprising more than half of a circle, means on said housing for removably securing the deflector thereto, means defining an uninterrupted bottom downwardly directed opening at the lower portion of said deflector and said rotating disc whereby the deflector, disc, and opening cooperate to direct the processed foodstuffs in an interrupted downwardly disposed path into a bowl positioned for receiving the same.

12. In a food-cutting machine with semiautomatic feed as defined in claim 11, a bayonet fastener at the end of the drive shaft, said bayonet fastener being characterized by a pair of upstanding members with offsetting lugs, said rotating disc having a center portion with crescent-shaped receiving notches, the latter being engaged by the offset lugs.

13. In the food-cutting machine of claim 12, centering means comprising a pin at the center of the drive shaft, and means of defining a centering pin receiving hole at the center of the rotating disc and flanked by the crescent-shaped receiving notches.

14. In the food-cutting machine of claim 11, the improved means for supporting the disc and securing the pusher for yieldably urging the pusher through the hopper, comprising, a spring disc support having a body with a disc notch and spring engaging aperture, means defining an opening in the housing through which the body of the spring-disc support passes in engagement therewith, stop means on the body proportioned to abut the housing, a spring secured at one end to the spring-engaging aperture and the other end to the pusher, and rib means at the periphery of the disc proportioned to rotate within the disc notches.

15. In the food-cutting machine of claim 11, said pusher having a cover proportioned to overlie the hopper, said pusher having a cover proportioned to overlie the hopper, a pusher face, a generally triangular gusset joining the cover member and pusher face, pivot wings extending from opposed corners of the cover, mounting means extending upwardly from the housing at opposed sides of the hopper, and pivot means coacting with the wings and mounting means pivotally connecting the pusher to the housing.

16. In the food-cutting machine of claim 11, a cage joining the opposed sides of the hopper, a roller lower end support on the hopper sidewall having a plurality of roller receiving elements, and an upper roller support on the sidewall support in opposed relationship to the lower roller end support and having opposed roller-receiving elements, the roller elements on the sidewalls cooperating to journal the rollers therebetween.

17. A disc for use in the food-cutting machine of claim 11 having,
- a disc body formed of a metal circular sheet,
- a central reversible self-energizing fastening means proportioned to coact with the drive shaft of the food-cutting machine,
- and cutting elements of different configuration oriented on both sides of the disc body whereby differing cuts can be made when the disc is reversed.

18. In a food-cutting machine having a housing; a hopper in said housing; a drive shaft extending through the housing; means on the end of the shaft to removably secure a cutting disc in operative engagement with the housing,
- the improved disc construction characterized by a flat circular disc plate,
- a plurality of cutting members on one side of the disc, and a plurality of cutting members on the other side of the disc,
- said means on the end of the shaft to removably secure the cutting disc being self-energizing lugs proportioned for cooperative relationship with through holes provided in the center portion of said disc in opposed cooperative relationship with said lugs,
- each set of cutting members associated with one side of the disc being recessed and inoperative with respect to the opposite side of the disc plate, whereby upon reversal two separate cutting patterns are achieved through the engagement of the respective sides of the disc with foodstuffs advanced through the hopper.

19. In the food-cutting machine of claim 18, one side of said disc having deep-drawn julienne cuts.

20. In the food-cutting machine of claim 19, said julienne cuts having a crescent-shaped relief portion in opposed spaced relation to a crescent-shaped cutting lip on the deep-drawn julienne cutting elements.

21. In the food-cutting machine of claim 20, said julienne cutting elements being oriented radially forwardly from the center of the plate.

22. In the food-cutting machine of claim 19, said julienne cutting elements being oriented in four radially forwardly spaced locations, the successive rows of which are staggered to overlap the spaces between the preceding row.

23. In the food-cutting machine of claim 22, a plurality of grater cutting elements between and on the opposite sides of the julienne cutter rows, said grater cutting elements being disposed in radial staggered rows of varying numbers between the rows of julienne cutters.

24. In the food-cutting machine of claim 18, a plurality of radially oriented relief slots, a flat cutting edge on one side of each relief slot.

25. In the food-cutting machine of claim 18, a plurality of radially oriented relief slots, straight blades secured to one side of the relief slot, and ripple edges formed on the opposite side of the relief slot.

26. In the food-cutting machine of claim 18, an embossed reinforcing rib adjacent the periphery thereof.

27. In the food-cutting machine of claim 18, a plurality of stress relief locators formed at the center of the disc to shrink the disc and relieve the stresses induced in forming the cutting members.

28. In the food-cutting machine of claim 26, a spacer secured to the center of the disc having a thickness to present an outer face in the same plane as the edge of the embossed reinforcing rib.

29. In the food-cutting machine of claim 28, a plurality of stress relief locators formed at the center of the disc and peripherally of the spacer to assist in locating the spacer and stress relieve the disc by shrinking the same centrally of the cutting members.

30. A food-cutting machine with semiautomatic feed comprising, in combination,
- a housing,
- a hopper having an opening within the housing,
- a pusher pivotally mounted to pass through the hopper for advancing foodstuffs therethrough toward the hopper opening,
- a rotating disc proportioned for cutting relationship with the hopper opening,
- a drive shaft journaled in said housing,
- means for rotating said drive shaft,
- a self-energizing bayonet fastener at the end of the drive shaft,
- means on said rotating disc for self-energizing engagement with the drive shaft fastener, and
- a disc support adjacent the hopper opening formed to receive the cutting disc periphery and coact with the self-energizing fastener to removably and reversibly secure the disc for rotation by the drive shaft.

31. In the food-cutting machine of claim 30, pair of disc supports positioned adjacent the hopper opening.

32. In the food-cutting machine of claim 31, said pair of disc supports being positioned in symmetrically opposed relationship adjacent the hopper opening.

33. In the food-cutting machine of claim 30, a pair of disc periphery limit stops positioned on the housing to engage the disc periphery at opposed stations beneath the self-energizing fastener.

34. In the food-cutting machine of claim 31, a pair of disc periphery limit stops positioned on the housing to engage the disc periphery at opposed stations beneath the self-energizing fastener.

35. In the food-cutting machine of claim 32, a pair of disc periphery limit stops positioned on the housing to engage the disc periphery at opposed stations beneath the self-energizing fastener.

36. In the food-cutting machine of claim 30,
- a circular rib at the periphery of said disc,
- and a spacer at the center of the disc extending in the same direction as the circular rib to accommodate reversal of the disc while maintaining symmetry with the disc support.

37. In the food-cutting machine of claim 31,
- a circular rib at the periphery of said disc,
- and a spacer at the center of the disc extending in the same direction as the circular rib to accommodate reversal of the disc while maintaining symmetry with the disc support.

38. In the food-cutting machine of claim 32,
- a circular rib at the periphery of said disc,
- and a spacer at the center of the disc extending in the same direction as the circular rib to accommodate reversal of the disc while maintaining symmetry with the disc support.

39. In the food-cutting machine of claim 33,
- a circular rib at the periphery of said disc,
- and a spacer at the center of the disc extending in the same direction as the circular rib to accommodate reversal of the disc while maintaining symmetry with the disc support.

40. In the food-cutting machine of claim 34,
- a circular rib at the periphery of said disc,
- and a spacer at the center of the disc extending in the same direction as the circular rib to accommodate reversal of the disc while maintaining symmetry with the disc support.

41. In the food-cutting machine of claim 35,
- a circular rib at the periphery of said disc, and
- means defining a disc-positioning notch in said disc support to nestingly receive the disc circular ribs.

42. In the food-cutting machine of claim 30, a deflector removably secured to the outer upper portion of the housing.

43. In the food-cutting machine of claim 42, said housing having a bowl foot proportioned to cooperate with said deflector to direct cut foodstuffs into a bowl positioned adjacent the foot and beneath the deflector.

44. In the food-cutting machine of claim 42,
said deflector having a rejection surface on its inner face opposite said disc to inhibit flat wet contact with the cut food.

45. In the food-cutting machine of claim 11,
means for securing said drive shaft against longitudinal movement.

46. In the food-cutting machine of claim 30,
means for securing said drive shaft against longitudinal movement.